United States Patent
Haugen

(10) Patent No.: US 9,032,723 B2
(45) Date of Patent: May 19, 2015

(54) HYDRAULIC HYBRID VEHICLE WITH SAFE AND EFFICIENT HYDROSTATIC OPERATION

(75) Inventor: David J Haugen, Ann Arbor, MI (US)

(73) Assignee: The United States of America, as represented by the Administrator of the U.S. Environmental Protection Agency, Washington, DC (US)

(*) Notice: Subject to any disclaimer, the term of this patent is extended or adjusted under 35 U.S.C. 154(b) by 343 days.

(21) Appl. No.: 13/580,814

(22) PCT Filed: Mar. 9, 2011

(86) PCT No.: PCT/US2011/027667
§ 371 (c)(1),
(2), (4) Date: Aug. 23, 2012

(87) PCT Pub. No.: WO2011/112663
PCT Pub. Date: Sep. 15, 2011

(65) Prior Publication Data
US 2012/0324879 A1    Dec. 27, 2012

Related U.S. Application Data

(60) Provisional application No. 61/311,835, filed on Mar. 9, 2010.

(51) Int. Cl.
*F16H 61/40* (2010.01)
*F16H 61/4096* (2010.01)
*B60K 6/12* (2006.01)

(52) U.S. Cl.
CPC .............. *F16H 61/4096* (2013.01); *B60K 6/12* (2013.01); *Y02T 10/6208* (2013.01)

(58) Field of Classification Search
USPC ............................................ 60/413, 414, 416
See application file for complete search history.

(56) References Cited

U.S. PATENT DOCUMENTS

| | | | | |
|---|---|---|---|---|
| 3,148,702 A * | 9/1964 | Mercier | ......................... | 138/30 |
| 4,204,405 A * | 5/1980 | Basham | ......................... | 60/414 |
| 4,518,053 A * | 5/1985 | Queveau | ....................... | 180/307 |
| 6,427,441 B2 | 8/2002 | Wustefeld | | |
| 6,619,325 B2 | 9/2003 | Gray | | |
| 6,719,080 B1 * | 4/2004 | Gray, Jr. | ......................... | 60/414 |

* cited by examiner

*Primary Examiner* — Thomas E Lazo
(74) *Attorney, Agent, or Firm* — David H. Read

(57) ABSTRACT

A shut off valve is configured to shut off flow from the high pressure fluid line to the high pressure accumulator in a series hydraulic hybrid vehicle in order to quickly raise system pressure in the high pressure fluid line and enable additional torque output from the hydraulic motor for vehicle propulsion. A pressure relief valve is further provided to vent excess flow from the high pressure line to the high pressure accumulator as needed to avoid exceeding a maximum desired system pressure in the high pressure fluid line, thereby providing for safe and efficient hydrostatic operation in the vehicle.

5 Claims, 3 Drawing Sheets

_US 9,032,723 B2_

HYDRAULIC HYBRID VEHICLE WITH SAFE AND EFFICIENT HYDROSTATIC OPERATION

BACKGROUND OF THE INVENTION

1. Field of the Invention

This invention relates to hydraulic hybrid motor vehicles and to vehicles with hydrostatic drive systems.

2. Description of the Related Art

Series hydraulic hybrid powertrains are being studied as a way to improve the fuel efficiency of motor vehicles. Commonly-assigned U.S. Pat. No. 6,719,080 to Gray, which is incorporated herein by reference, describes one example of a hydraulic hybrid powertrain motor vehicle utilizing a series mode of operation. In one aspect of the Gray '080 patent, an internal combustion engine drives a hydraulic pump to pressurize working fluid from a low pressure (e.g., a few hundred psi) to a high pressure (e.g., several thousand psi). The high pressure fluid may then be (1) utilized to drive a hydraulic motor to propel the vehicle, and/or (2) used to help fill a high pressure accumulator for energy storage and later usage (e.g., for further/later vehicle propulsion). Some hydraulic hybrid powertrains that incorporate a mechanical drivetrain may still use this type of series hydraulic operation for certain vehicle modes.

The Gray '080 patent partially addresses a condition where there is a higher vehicle torque request than can be supplied by full displacement of the hydraulic drive motor(s) at the instant hydraulic system pressure. For this condition, the Gray '080 patent discloses valving out (i.e., closing a valve to shut off flow to) the high pressure accumulator to temporarily remove the high pressure accumulator from the hydraulic circuit, thus temporarily operating in a direct "hydrostatic" mode (defined here as a "constant volume" mode), which allows the engine-driven pump to quickly raise the system working pressure to make it possible to satisfy the vehicle's requested torque. See U.S. Pat. No. 6,719,080 at col. 12, lines 28-57. However, as indicated in Gray, this also creates a risk of exceeding the maximum rated pressure for the system. Gray therefore teaches managing of the engine power to avoid exceeding the rated system pressure. See U.S. Pat. No. 6,719,080 at col. 12, lines 57-61. As a practical matter, without further protection, this approach would mean that the system could not be operated at or very near the maximum pressure limit for the system without jeopardizing safety and reliability of the system, and would instead require operating at pressures comfortably lower to prevent safety concerns, which would therefore reduce fuel efficiency and vehicle performance. Additional or alternative safety measures are therefore desirable.

U.S. Pat. No. 6,427,441 to Wustefeld discloses a hydrostatic vehicle drive with a pressure-reducing valve to avoid exceeding maximum rated hydraulic system pressures. However, Wustefeld does not preserve the energy lost in reducing the instant hydraulic system pressure, which would thus result in a loss of fuel efficiency if applied in a motor vehicle. A more efficient approach is therefore also desirable.

Therefore, there is a need for a device or method to provide safe and efficient hydrostatic operation, particularly for series mode of operation on any hydraulic hybrid motor vehicles.

OBJECT OF THE INVENTION

The object of the invention is to provide a configuration and method for safe and efficient hydrostatic operation, particularly for hydraulic hybrid motor vehicles that utilize a series mode of operation.

SUMMARY OF THE INVENTION

The series mode of operation on a hydraulic hybrid vehicle includes an engine-driven hydraulic pump which receives working fluid from a low pressure line and pressurizes the fluid to a higher pressure. A high pressure fluid line conveys the pressurized fluid to a hydraulic motor, where the pressurized fluid drives the hydraulic motor to provide useful work. An energy storage high pressure accumulator is fluidly connected to the high pressure fluid line, to (1) receive pressurized fluid from the hydraulic pump and retain the fluid in a highly pressurized state for energy storage purposes, and (2) provide pressurized fluid as needed to drive the hydraulic motor. A shut off valve is configured to shut off flow from the high pressure line to the high pressure accumulator when desired, such as when hydrostatic operation is needed to quickly raise system pressure in the high pressure fluid line to enable additional torque output from the hydraulic motor. A pressure relief valve, which may be either separate from or integrated with the shut off valve if desired, is further provided and configured to vent pressurized fluid from the high pressure line to the high pressure accumulator as needed to avoid exceeding a maximum desired system pressure in the high pressure fluid line.

DETAILED DESCRIPTION OF THE INVENTION

Figure 1:
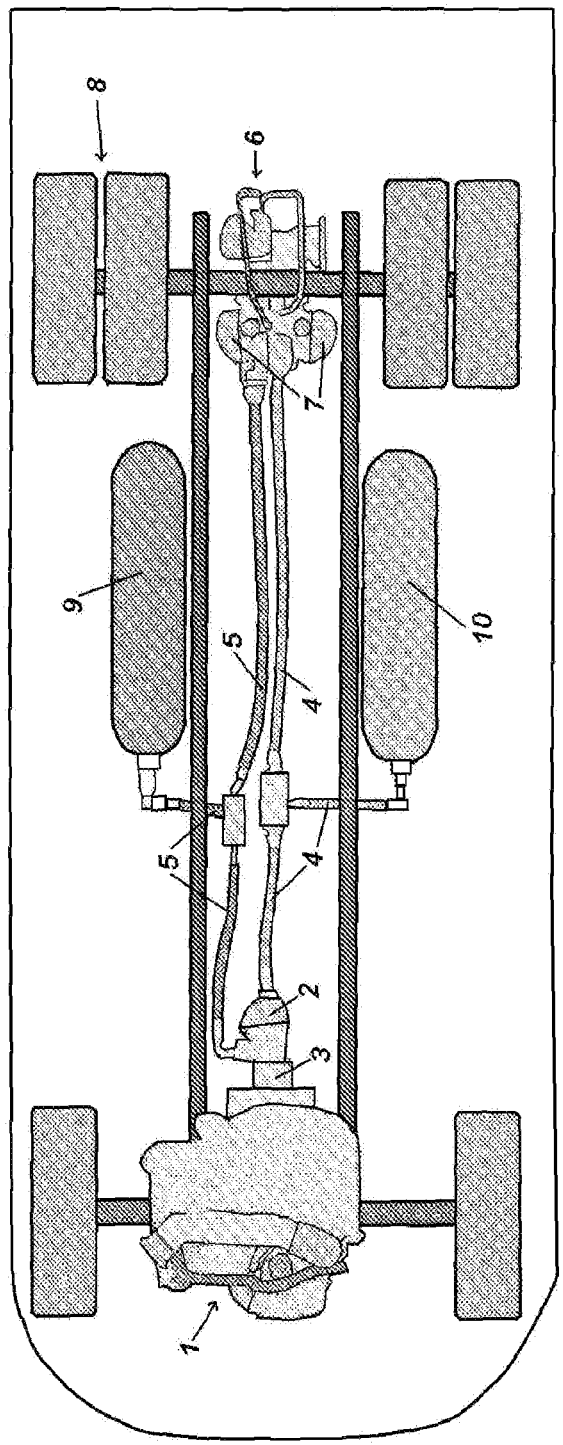
FIG. 1 presents a schematic drawing of a series hydraulic hybrid motor vehicle.

FIG. 1 presents a series hydraulic hybrid powertrain for a motor vehicle. An embodiment of a powertrain like this is more fully described in commonly-assigned U.S. Pat. No. 6,719,080 to Gray, which description is incorporated herein by reference. Referring to FIG. 1, internal combustion engine 1 operates to drive a hydraulic pump/motor 2 as a hydraulic pump. Engine pump/motor 2 may be integrated onto the crankshaft (not shown) of engine 1, or driven by a driveshaft 3. In pump mode, pump/motor 2 receives low pressure hydraulic fluid from low pressure line 4 and pressurizes the fluid to a higher pressure. The higher pressure fluid then exits the pump to high pressure line 5. This high pressure fluid in line 5 may then be sent (a) to hydraulic drive assembly 6 wherein one or more hydraulic motors 7 are driven by the fluid pressure to provide motive power to the vehicle drive wheels 8, or (b) to high pressure accumulator 9 for energy storage and later reuse of the pressurized working fluid, or (c) to both purposes. A low pressure accumulator 10 provides a reservoir for the low pressure hydraulic fluid.

Figure 2:
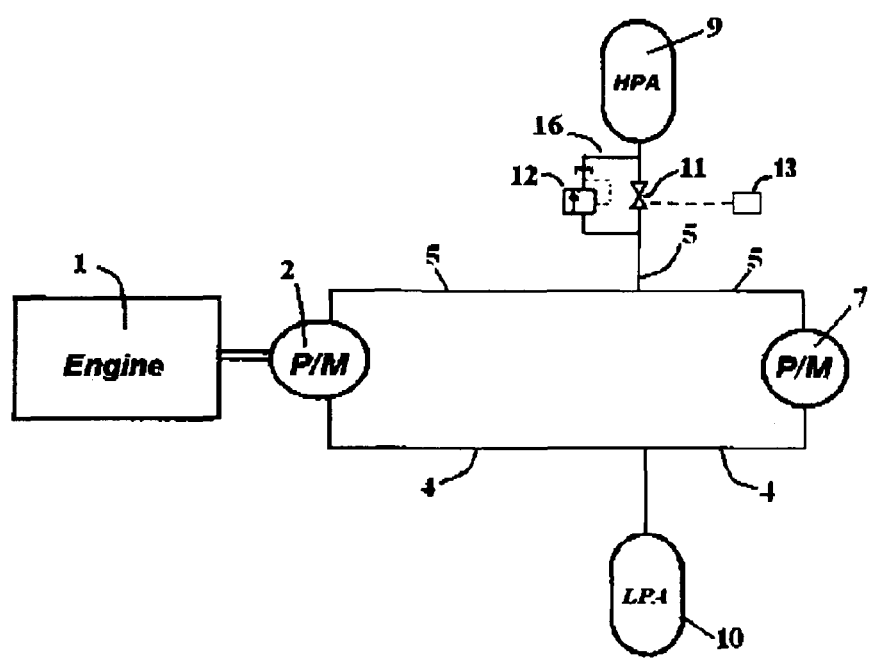
FIG. 2 presents a schematic drawing of an improved hydraulic circuit for a series hydraulic hybrid drive system, according to one embodiment of the invention.

Referring now to FIG. 2, a portion of the drivetrain of FIG. 1 is repeated in schematic form, but with a shut off valve 11 and a pressure relief valve 12 shown between the high pressure accumulator 9 and high pressure fluid line 5. A valve controller 13 is also provided. An example of an accumulator shut-off valve 11 is described in commonly-assigned U.S. Pat. No. 6,619,325, which is incorporated herein by reference. Alternatively, other known fluid shut-off valves may be used. In other structural respects, the system may remain in accord with the vehicle of FIG. 1 (e.g., with the hydraulic motor(s) 7 mechanically connected to drive wheels 8, etc). For safe and reliable hydrostatic operation of the vehicle of FIGS. 1 and 2, a pressure relief function (provided by pressure relief valve 12 in FIG. 2) in the high pressure system to bleed flow (as necessary) helps to prevent an over pressure condition in the high pressure side of the hydrostatic system. Capturing the excess pressure-bleed flow from the pressure relief valve 12 into the high pressure accumulator 9, by bypassing the shut-off valve 11 through bypass line 16, recovers energy that would otherwise be lost if, as would be more conventional for pressure relief in a hydrostatic system, the over-pressure flow was bled down to the lower pressure side of the hydrostatic system.

In operation of the vehicle, as discussed above, hydrostatic operation may be beneficial when, for example, the vehicle fails to accelerate at a rate requested by the driver because the high pressure hydraulic system pressure is not at a sufficiently high level. In such an event, valve controller 13 closes shut off valve 11, thereby shutting off flow between high pressure fluid line 5 and high pressure accumulator 9. As engine 1 continues to drive pump 2 to pressurize fluid, the pressure level within high pressure fluid line 5 rises more rapidly toward the maximum desired system pressure, thereby enabling faster and greater torque output from drive motors 7 to mechanically propel the vehicle. If the pressure within high pressure fluid lines 5 reaches the maximum desired pressure level, pressure-relief valve 12 is triggered (either electronically according to a sensed pressure imbalance across the valve, or by a mechanical spring-pressure balance) open to bleed a portion of the fluid from line 5 to high pressure accumulator 9. Shut off valve 11 is opened again when the hydrostatic pressure in fluid line 5 drops back to the point (i.e., within a target level) where opening the valve 11 will not cause a sudden or unwelcome pressure drop that would affect drivability (e.g, where the pressure imbalance is less than a determined threshold, such as 2% or 5% of the system pressure).

It should be noted that this temporary increase of the system hydraulic pressure to the maximum level can double or more the available drive wheel torque that would otherwise be instantly available from hydraulic motor(s) 7. The pressure-relief system provided herein can also relieve the engine pump control system from required operation at a significant margin below the maximum system pressure, which could otherwise reduce efficiency.

Figure 3:
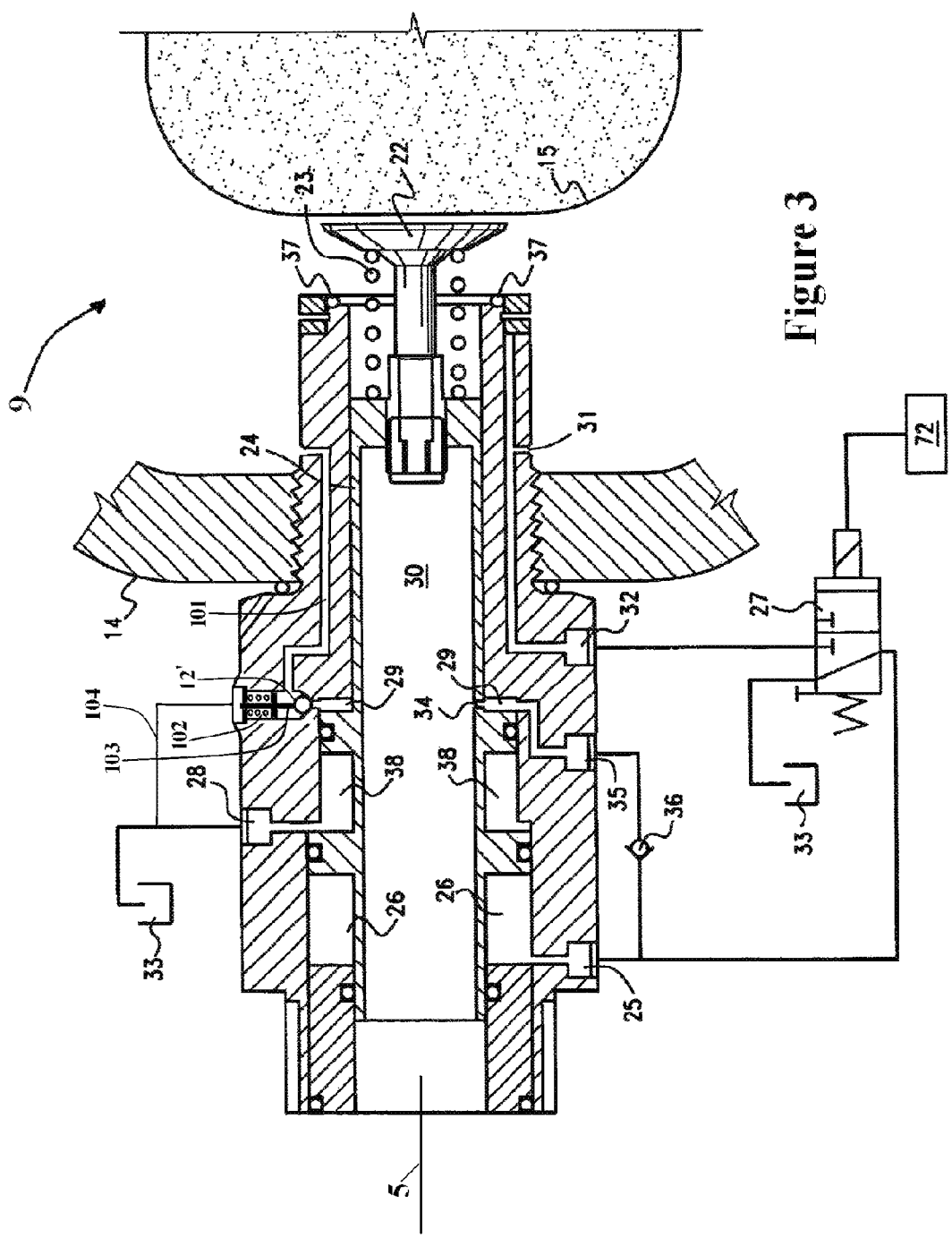
FIG. 3 depicts an accumulator shut-off valve according to another embodiment of the present invention.

As an alternative to using a separate pressure relief valve, the pressure relief valve 12 may be integrated into the accumulator shut-off valve 11. Referring to FIG. 3, which is a modified figure similar in many respects to a figure of commonly-assigned U.S. Pat. No. 6,619,325, it is indicated how a pressure relief function as described above could be incorporated into the design of the accumulator shut-off valve placed between a high pressure accumulator 9 and the high pressure fluid lines 5 of FIGS. 1 and 2. As can be seen in FIG. 3, a fluid bypass passageway 101 is provided connecting the interior of high pressure accumulator 9 with the fluid in chambers 29 and 30 through port 34. The fluid in chamber 30 is fluidly connected to high pressure line 5, with pressure relief valve 12' positioned to control flow of pressurized fluid from chambers 29 and 30 (and thus high pressure line 5) to fluid passage 101. Pressure relief valve 12' is configured with a biasing means (such as a spring 102 with stem 103) to bias the valve 12' to a closed position, thereby preventing flow from chamber 29 to or from high pressure accumulator 9. However, as the fluid pressure in line 5 exceeds the desired threshold, the additional pressure in line 5 (and thus chambers 30 and 29) overcomes the force of the biasing means (spring 102) and causes the valve 12' to open, thereby allowing flow of pressurized fluid past valve 12' and through passageway 101 into the high pressure accumulator 9. Hydraulic line 104 is preferably provided to vent any fluid that leaks past the pressure relief valve and biasing means to a low pressure reservoir 33 (i.e., low pressure accumulator 10 in FIGS. 1 and 2 of this application).

With this description, it is easily within the ordinary skill of the art to incorporate this pressure relief function into an accumulator shut-off valve. Other devices and structures to accomplish the pressure relief function would also be known in the art, including incorporation of known pressure-relief valves into the hydraulic circuit as indicated and explained for the embodiment of FIG. 2 above.

The invention herein is therefore intended to be limited solely by the claims.

I claim:

1. A hydraulic hybrid motor vehicle, comprising:
   an internal combustion engine,
   a hydraulic pump driven by the internal combustion engine, thereby pressurizing a working fluid for transmission through a high pressure fluid line,
   a hydraulic motor fluidly connected to the hydraulic pump through the high pressure fluid line, said hydraulic motor driven by the pressurized working fluid from the high pressure fluid line, thereby providing propulsive power to drive wheels of the motor vehicle,
   a high pressure accumulator fluidly connected to the high pressure fluid line, configured to receive and store the pressurized working fluid in a pressurized state;
   a shut off valve configured to selectively prevent flow of the pressurized working fluid into and out of the high pressure accumulator; and
   a pressure relief valve, configured to allow pressurized fluid in the high pressure fluid line to bypass the shut off valve and enter the high pressure accumulator when the pressurized fluid in the high pressure fluid line exceeds a maximum safe pressure.

2. The vehicle of claim 1, wherein the pressure relief valve and the shut off valve are integrated into a single valve device.

3. A method of operating a hydraulic hybrid motor vehicle, comprising:
   operating an internal combustion engine to drive a hydraulic pump, thereby pressurizing fluid in a high pressure fluid line;
   driving a hydraulic motor with a portion of the pressurized fluid from the high pressure fluid line, thereby providing output torque at wheels of the motor vehicle to propel the motor vehicle;
   storing additional pressurized fluid from the high pressure fluid line in a hydraulic pressure accumulator when the instant pressure in the high pressure fluid line is sufficient for the hydraulic motor to meet a desired output torque at the wheels of the motor vehicle; and
   when desired output torque at the wheels of the motor vehicle cannot be met at the instant pressure in the high pressure fluid line: (i) shutting off flow of hydraulic fluid from the high pressure fluid line to the high pressure hydraulic accumulator, (ii) allowing the pressure of the pressurized fluid in the high pressure fluid line to increase, (iii) opening a pressure relief valve to allow a first portion of fluid from the high pressure line to bypass any shut-off and flow into the high pressure accumulator when the pressure in the high pressure fluid line reaches a maximum desired pressure for safety; and (iv) storing the first portion of pressurized fluid in the high pressure hydraulic accumulator.

4. The method of claim 3, further comprising re-opening flow between the high pressure fluid line and the high pressure accumulator once the system pressure in the high pressure fluid line drops to within a target level.

5. An accumulator shut-off valve, configured to selectively shut off flow of fluid in a high pressure fluid line that fluidly connects a hydraulic pump and a high pressure hydraulic accumulator, said accumulator shut-off valve further comprising a pressure relief valve integrated therein, said pressure relief valve being configured to allow high pressure fluid to enter the hydraulic accumulator from the high pressure fluid line as the fluid pressure in the high pressure fluid line exceeds a predetermined maximum safety level for the high pressure fluid line.

* * * * *